(12) United States Patent
Seong et al.

(10) Patent No.: US 7,656,948 B2
(45) Date of Patent: Feb. 2, 2010

(54) TRANSCODING SYSTEM AND METHOD FOR MAINTAINING TIMING PARAMETERS BEFORE AND AFTER PERFORMING TRANSCODING PROCESS

(75) Inventors: Yeong-kyeong Seong, Seoul (KR); Hyo-seop Shin, Seoul (KR); In-sun Kang, Seoul (KR); Gil-more Koo, Yongin-si (KR); Hye-soo Lee, Seoul (KR); Jae-hoon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1086 days.

(21) Appl. No.: 11/053,904

(22) Filed: Feb. 10, 2005

(65) Prior Publication Data
US 2005/0190872 A1 Sep. 1, 2005

(30) Foreign Application Priority Data
Feb. 14, 2004 (KR) ................ 10-2004-0009861

(51) Int. Cl.
*H04N 7/12* (2006.01)
*G01R 31/08* (2006.01)

(52) U.S. Cl. .................. 375/240.01; 370/236
(58) Field of Classification Search ............ 375/240.1, 375/240.27, 240.01; 370/236; 707/104.1; 725/87
See application file for complete search history.

(56) References Cited

U.S. PATENT DOCUMENTS

| | | | |
|---|---|---|---|
| 6,345,279 B1 * | 2/2002 | Li et al. ................ | 707/104.1 |
| 6,724,825 B1 * | 4/2004 | Nemiroff et al. ....... | 375/240.27 |
| 6,954,432 B1 * | 10/2005 | Bychowsky et al. ........ | 370/236 |
| 2001/0047517 A1 * | 11/2001 | Christopoulos et al. ....... | 725/87 |
| 2002/0144291 A1 | 10/2002 | Smiley et al. | |
| 2003/0001964 A1 | 1/2003 | Masukura et al. | |

FOREIGN PATENT DOCUMENTS

| | | |
|---|---|---|
| CN | 1316133 A | 10/2001 |
| EP | 1 111 796 A1 | 6/2001 |
| EP | 1 323 312 B1 | 10/2004 |
| EP | 1323312 B1 | 10/2004 |
| JP | 2003-087785 A | 3/2003 |
| JP | 2003-230092 A | 8/2003 |
| KR | 2000-0076641 A | 12/2000 |
| KR | 2003-0061808 A | 7/2003 |
| WO | 01/03305 | 1/2001 |
| WO | WO 01/03305 A1 | 1/2001 |
| WO | WO 02/25952 A2 | 3/2002 |

* cited by examiner

*Primary Examiner*—Gims S Philippe
(74) *Attorney, Agent, or Firm*—Sughrue Mion, PLLC

(57) ABSTRACT

A transcoding system and method effectively synchronize segmentation metadata with A/V content when converting an MPEG stream to another format stream using a segment browser. The transcoding system includes a timing synchronizer, which adjusts the timing parameters so that the video data can be synchronized with segmentation metadata even after the transcoding process, a transcoding condition determiner, which determines transcoding conditions suitable for an end user environment, and an encoder, which compresses a video sequence reconstructed from the video data according to the transcoding conditions determined by the transcoding condition determiner and records a presentation time stamp, which is one of the adjusted timing parameters, in the compressed video sequence.

15 Claims, 10 Drawing Sheets

TRANSCODING SYSTEM AND METHOD FOR MAINTAINING TIMING PARAMETERS BEFORE AND AFTER PERFORMING TRANSCODING PROCESS

CROSS-REFERENCE TO RELATED APPLICATION

This application claims priority from Korean Patent Application No. 10-2004-0009861 filed on Feb. 14, 2004, in the Korean Intellectual Property Office, the disclosure of which is incorporated herein in its entirety by reference.

BACKGROUND OF THE INVENTION

1. Field of the Invention

The present invention relates to video compression, and more particularly, to a transcoding system and method that can effectively synchronize segmentation metadata with AV contents when converting an MPEG stream from one bit rate to another, from one frame size to another, or from one compression format to another, storing or transmitting the converted stream, or reproducing the converted stream using a segment browser.

2. Description of the Related Art

A transcoding process is a process of converting a compressed video signal into another video signal having a different rate, a different video frame rate, a different video frame size, or a different compression type to the compressed video signal, and a transcoder is an apparatus that performs the transcoding process.

Due to the development of a variety of multimedia application programs and the improvement of communication environments, the demand for communications between different types of networks or protocols has been steadily growing. For example, in order to transmit a video stream between different types of networks, a special communication path should be set up between a video source and a user. In this case, a bandwidth for a compressed video stream is adjusted to be compatible with the severest (lowest) transmission rate provided in network connection when encoding source video.

The bandwidth of a real-time video stream is adjusted by changing the coding parameters of the source encoder. In this case, however, since the encoding bit rate should be lowered to be compatible with a link under the worst condition, poor picture quality may be resulted. In other words, even a system capable of processing higher quality images is likely to end up having low quality images. In current communication environments, in which a variety of user devices are used together, many problems may be caused due to the fact that transmission channels are likely to have different characteristics and different capabilities from one another.

Recently, an increasing number of users have had a preference for compact-sized portable devices, such as mobile phones or personal digital assistants (PDAs), for the purpose of video communications or access to the Internet. Most portable devices, however, have limited computation and display capabilities. Therefore, they are not suitable for high-resolution video decoding or displaying processes. In order to display high-resolution video streams using such portable devices, the high-resolution video streams should be converted into lower-resolution ones.

As various video compression standards, such as H.261, H.263, H.264, MPEG1, MPEG2, and MPEG4, have been developed, the demand for convertibility of video streams of one video compression type into video streams of another video compression type has steadily grown. In the case of loading a video source in a video stream and transmitting the video stream via client channels of different capabilities, the video stream should be converted to have a bit rate appropriate for each of the client channels. In particular, this requirement becomes important when holding a multi-spot video conference, in which a plurality of video streams should be transmitted over a limited number of channels after appropriately converting their respective bit rates.

Video transcoding technology has been developed to solve the above problem. Such technology enables a compressed video stream to be transmitted between different types of networks or between different user devices by converting the compressed video stream from one format to another. A video transcoder, like a source encoder, can change image data by adjusting several parameters, such as picture quality, frame rate, and resolution.

After such a transcoding process, it is necessary to appropriately reset timing parameters. Hereinafter, various conventional techniques of appropriately adjusting timing parameters after a transcoding process will be described.

An MPEG decoder changes its local system time based on a time stamp indicating an encoder's local system time. Data is input from an original input source to the encoder at a predetermined bit rate. The encoder outputs data having a variable bit rate. The data output from the encoder is input to an encoder buffer. Finally, stream data having a constant bit rate is output from the encoder buffer. The stream data is input to a decoder buffer via a radio frequency (RF) transmission channel at a predetermined bit rate and then input to the MPEG decoder at a variable bit rate. Accordingly, data having a predetermined bit rate is output from the decoder buffer. A timing synchronization process is performed to process data converted from a variable bit rate to a fixed bit rate or vice versa.

A conventional transcoder operates with a predetermined delay on the assumption that there is zero delay among a decoder block, a transmission port, and an end of an encoder. A decoder operates in synchronization with a time stamp of an encoder in the following manner. The encoder includes a main oscillator, which serves as a system time clock (STC), and a counter. The STC belongs to a predetermined program and is a main clock of a program for video and audio encoders.

In some MPEG standards, a time stamp may not be used for time synchronization, in which case, synchronization of different components with one another may not be guaranteed. When a video frame or audio block is input to an encoder, the encoder samples an STC from the video frame or the audio block. A constant indicating a delay between the encoder and the decoder buffer is added to the sampled STC, thereby forming a presentation time stamp (PTS). The PTS is inserted in a header of the video frame or the audio block.

In the case of reordering video frames, decode time stamps (DTSs), which indicate when each of the video frames is to be decoded by the decoder, are respectively inserted into the video frames. DTSs, which are necessary for a frame reordering process, can be the same values as their respective PTSs, except for the case of reordering B pictures. Whenever DTSs are used, PTSs are used. A DTS and a PTS are inserted into a video frame so that they are located less than or equal to 700 msec apart from each other.

According to the Advanced Television Systems Committee (ATSC), a PTS and a DTS are inserted into a header of each picture. The encoder buffer outputs transport packets each having a time stamp called program clock reference (PCR) or packetized elementary streams (PES) each having a time stamp called a system clock reference (SCR). The PCR is generated at intervals of 100 msec, and the SCR is generated at intervals of up to 700 msec. The PCR or SCR is used to synchronize an STC of the decoder with an STC of the encoder.

A program stream (PS) has an SCR as its clock reference, and a transport stream (TS) has a PCR as its clock reference. Therefore, each type of video stream or audio stream has a time stamp corresponding to an STC so as to synchronize the STC of the decoder with the STC of the encoder.

A segment browser provides a function for non-linearly reproducing a broadcasting stream using segmentation metadata, as defined by the TV-Anytime Forum. The TV-Anytime Forum is an association of private standards organizations, which seeks to enable viewers to watch various types of broadcasting programs, including conventional types of broadcasting programs and on-line interactive broadcasting services, at any time using their own storage devices. More specifically, the TV-Anytime Forum aims to develop standards regarding a service environment, in which real-time broadcasting services and Internet services are integrated.

The segmentation metadata used in the segment browser provides additional content information, such as highlights, a table of contents, or bookmarks. For example, the segmentation metadata enables only highlights of a soccer game, such as goal-scoring scenes, or only newscasts regarding a user's specific preference field to be broadcasted to the user.

Broadcasting streams are provided by a content provider and broadcasted to the user via a broadcasting system, while segmentation metadata is provided by a metadata provider and broadcasted to the user via the Internet. In other words, since the broadcasting streams and the segmentation metadata are provided by different providers, it is necessary to synchronize the timing of supply of the broadcasting streams with the timing of supply of the segmentation metadata.

Due to changes in user environments, the demand for a variety of platforms is on the increase. Recently, a personal digital recorder (PDR), in which a broadcasting stream receiver is integrated with a digital storage medium, has been developed. The PDR requires one type of broadcasting stream to be converted into another type of broadcasting stream and to be temporarily stored. Therefore, service providers are increasingly expected to provide broadcasting content that can easily be converted from one format to another at any time. A transcoder performs a function for converting such broadcasting content from one format to another. More specifically, the transcoder decodes a broadcasting stream compressed in an MPEG format and compresses the decoded stream into another format.

An MPEG broadcasting stream is stored in a storage medium as a TS or PS. The MPEG broadcasting stream includes time information, such as a PCR or SCR, which is used for synchronizing an encoder with a decoder, an STC, and a PTS and a DTS, which are used for synchronizing audio content with video content. The MPEG broadcasting stream is reconstructed using the decoder, and the time information disappears after being used to synchronize the decoder with the encoder and to synchronize the audio content with the video content.

Each segment of segmentation metadata includes a PTS or DTS so that a video stream can be synchronized with an audio stream. Therefore, if any desired segment of the segmentation metadata is searched for and selected at an end decoder, corresponding metadata is output to a user, and video or audio data corresponding the selected segment is displayed.

As disclosed in, for example, Japanese Patent Publication No. 2003-230092, in the case of resetting a PTS (or DTS) of each stream through decoding and re-encoding processes or in the case of multiplexing a plurality of TSs into a single TS, the value of the PTS (or DTS) is increased by as much as a delay occurring in a transcoder, and then each stream is re-encoded, in order to synchronize video data with audio data. However, in the case of using metadata as well as A/V data, as described above, a PTS (or DTS) of the A/V data should not be arbitrarily reset; otherwise, an end user may not use the metadata properly.

Therefore, it is necessary to synchronize streams with each other without changing a PTS or DTS of each video frame or each audio block.

SUMMARY OF THE INVENTION

The present invention provides a timing synchronization method, which is performed in a transcoder, which is needed to provide multimedia services to a variety of platforms, converts and compresses data streams from one format to another format, to be operable with a segment browser.

The present invention also provides a method of preserving time information so that the segment browser can precisely access a data stream on a frame-by-frame basis.

In accordance with an aspect of the present invention, there is provided a transcoding system that maintains timing parameters before and after performing a transcoding process, the transcoding system comprising: a demultiplexer, which extracts timing parameters and vide data that is compressed in a predetermined manner from an input transport stream; a timing synchronizer, which adjusts the timing parameters so that the video data can be synchronized with segmentation metadata even after the transcoding process; a transcoding condition determiner, which determines transcoding conditions suitable for an end user environment; an encoder, which compresses a video sequence reconstructed from the video data according to the transcoding conditions determined by the transcoding condition determiner and records a presentation time stamp, which is one of the adjusted timing parameters, in the compressed video sequence; and a multiplexer, which generates an output transport stream by multiplexing the video sequence and the segmentation metadata and records a program clock reference, which is one of the adjusted timing parameters, in a header of the output transport stream.

The timing synchronizer may comprise: a total delay calculator, which calculates total delay time and a total number of delay counts occurring in the transcoding system; a phase locked loop, which receives a program clock reference PCR1 from the demultiplexer, adjusts a system clock, and outputs a system time count STC1 based on the adjusted system clock; a first adder, which obtains a system time count STC1* by inversing the signal of the system time count STC1 output from the phase locked loop and the sign of the total number of delay counts calculated by the total delay calculator and summing up inversion results, and outputs the system time count STC1* to a program clock reference generator; the program clock reference generator, which receives the system time count STC1* from the first adder, generates a program clock reference PCR2 based on the frequency of a predetermined clock signal, and transmits the program clock reference PCR2 to the multiplexer; and a second adder, which obtains a presentation time stamp PCR2 by inversing the sign of a presentation time stamp PTS1 output from the demultiplexer and the total number of delay counts calculated by the total delay calculator and summing up inversion results, and transmits the presentation time stamp PTS2 to the transcoding condition determiner.

Also, the timing synchronizer may comprise: a total delay calculator, which calculates total delay time and a total number of delay counts occurring in the transcoding system; a first phase locked loop, which receives a program clock reference PCR1 from the demultiplexer, adjusts a system clock, and outputs a system time count STC1 based on the adjusted system clock; a first adder, which obtains a system time count STC1* by inversing the signal of the system time count STC1 output from the first phase locked loop and the sign of the total number of delay counts calculated by the total delay calculator and summing up inversion results, and outputs the system time count STC1* to a program clock reference generator; a second phase locked loop, which receives the system clock count STC1* from the first adder, adjusts a system clock, and outputs a system time count STC2 based on the adjusted system clock; the program clock reference generator, which receives the system time count STC1* from the first adder, generates a program clock reference PCR2 based on the frequency of a predetermined clock signal, and transmits the program clock reference PCR2 to the multiplexer; and a second adder, which obtains a presentation time stamp PCR2 by inversing the sign of a presentation time stamp PTS1 output from the demultiplexer and the total number of delay counts calculated by the total delay calculator and summing up inversion results, and transmits the presentation time stamp PTS2 to the transcoding condition determiner.

The frequency of the predetermined clock signal is preferably 10 Hz.

The transcoding condition determiner receives the presentation time stamp PTS2 from the second adder, determines the transcoding conditions suitable for the end user environment, transmits a presentation time stamp PTS2*, which is obtained as a result of adjusting the presentation time stamp PTS2 according to the transcoding conditions, to the encoder via a register, and transmits a target frame rate, which is adjusted according to the transcoding conditions, to the encoder.

When the transcoding condition determiner decides to change a frame rate, the presentation time stamp PTS2* may be determined by the following equation:

$$PTS2^*(i) = PTS\_start + \Delta PTS \times (f1/f2) \times i$$

wherein f1 represents an original video frame rate, f2 represents a reset video frame rate, PTS_start represents a PTS2 value obtained when resetting of the original video frame rate initiates, ΔPTS represents the number of clocks counted between video frames, and i represents a serial number allotted to each of the video frames according to an order of presenting the video frames.

When the transcoding condition determiner decides to increase a frame rate, the encoder may create new frames through a frame interpolation process.

The timing synchronizer may comprise: a total delay calculator, which calculates total delay time and a total number of delay counts occurring in the transcoding system; a phase locked loop, which receives a program clock reference PCR1 from the demultiplexer, adjusts a system clock, and outputs a system time count STC1 based on the adjusted system clock; an adder, which obtains a system time count STC2 by inversing the signal of the system time count STC1 output from the phase locked loop and the sign of the total number of delay counts calculated by the total delay calculator and summing up inversion results, and outputs the system time count STC2 to a program clock reference generator; the program clock reference generator, which receives the system time count STC2 from the adder, generates a program clock reference PCR2 based on the frequency of a predetermined clock signal, and transmits the program clock reference PCR2 to the multiplexer; and a register, which sets the system time count STC2 as a final presentation time stamp PTS2* when it receives a load signal indicating that preparation of predetermined frames from the encoder, and provides the final presentation time stamp PTS2* to the encoder.

Alternatively, the timing synchronizer may comprise: a total delay calculator, which calculates total delay time and a total number of delay counts occurring in the transcoding system; a first phase locked loop, which receives a program clock reference PCR1 from the demultiplexer, adjusts a system clock, and outputs a system time count STC1 based on the adjusted system clock; an adder, which obtains a system time count STC1* by inversing the signal of the system time count STC1 output from the first phase locked loop and the sign of the total number of delay counts calculated by the total delay calculator and summing up inversion results, and outputs the system time count STC1* to a program clock reference generator; a second phase locked loop, which receives the system clock count STC1* from the first adder, adjusts a system clock, and outputs a system time count STC2 based on the adjusted system clock; the program clock reference generator, which receives the system time count STC1* from the first adder, generates a program clock reference PCR2 based on the frequency of a predetermined clock signal, and transmits the program clock reference PCR2 to the multiplexer; and a register, which sets the system time count STC2 as a final presentation time stamp PTS2* when it receives a load signal indicating that preparation of predetermined frames from the encoder, and provides the final presentation time stamp PTS2* to the encoder.

Also, the timing synchronizer may comprise: a total delay calculator, which calculates total delay time and a total number of delay counts occurring in the transcoding system; a program clock reference buffer, which receives a program clock reference PCR1 from the demultiplexer, stores the program clock reference PCR1 for the total delay time calculated by the total delay calculator, and then transmits the program clock reference PCR1 to a program clock reference generator; the program clock reference generator, which receives the program clock reference PCR1 from the program clock reference buffer, generates a program clock reference PCR2 based on the frequency of a predetermined clock signal, and transmits the program clock reference PCR2 to the multiplexer; and a presentation time stamp buffer, which receives a presentation time stamp PTS1 from the demultiplexer, and stores the presentation time stamp PTS 1 for the total delay time calculated by the total delay calculator, and then transmits the presentation time stamp PTS1 to the transcoding condition determiner.

The total number of delay counts may be calculated by the following equation:

$$\text{Total number of delay counts} = M/f \times N$$

wherein M represents a system clock frequency used for forming a PTS, f represents an original video frame rate, and N represents the number of video frames transcoded during the total delay time calculated by the total delay calculator.

In another aspect of the present invention, there is provided a transcoding method that maintains timing parameters before and after performing a transcoding process, the transcoding method comprising: extracting timing parameters and vide data that is compressed in a predetermined manner from an input transport stream; adjusting the timing parameters so that the video data can be synchronized with segmentation metadata even after the transcoding process;

receiving the video data extracted from the input transport stream and restoring a video sequence by decompressing the received video data; determining transcoding conditions suitable for an end user environment; re-compressing the restored video sequence according to the transcoding conditions and recording a presentation time stamp, which is one of the adjusted timing parameters, in the compressed video sequence; and generating an output transport stream by multiplexing the video sequence and the segmentation metadata, and recording a program clock reference, which is one of the adjusted timing parameters, in a header of the output transport stream.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
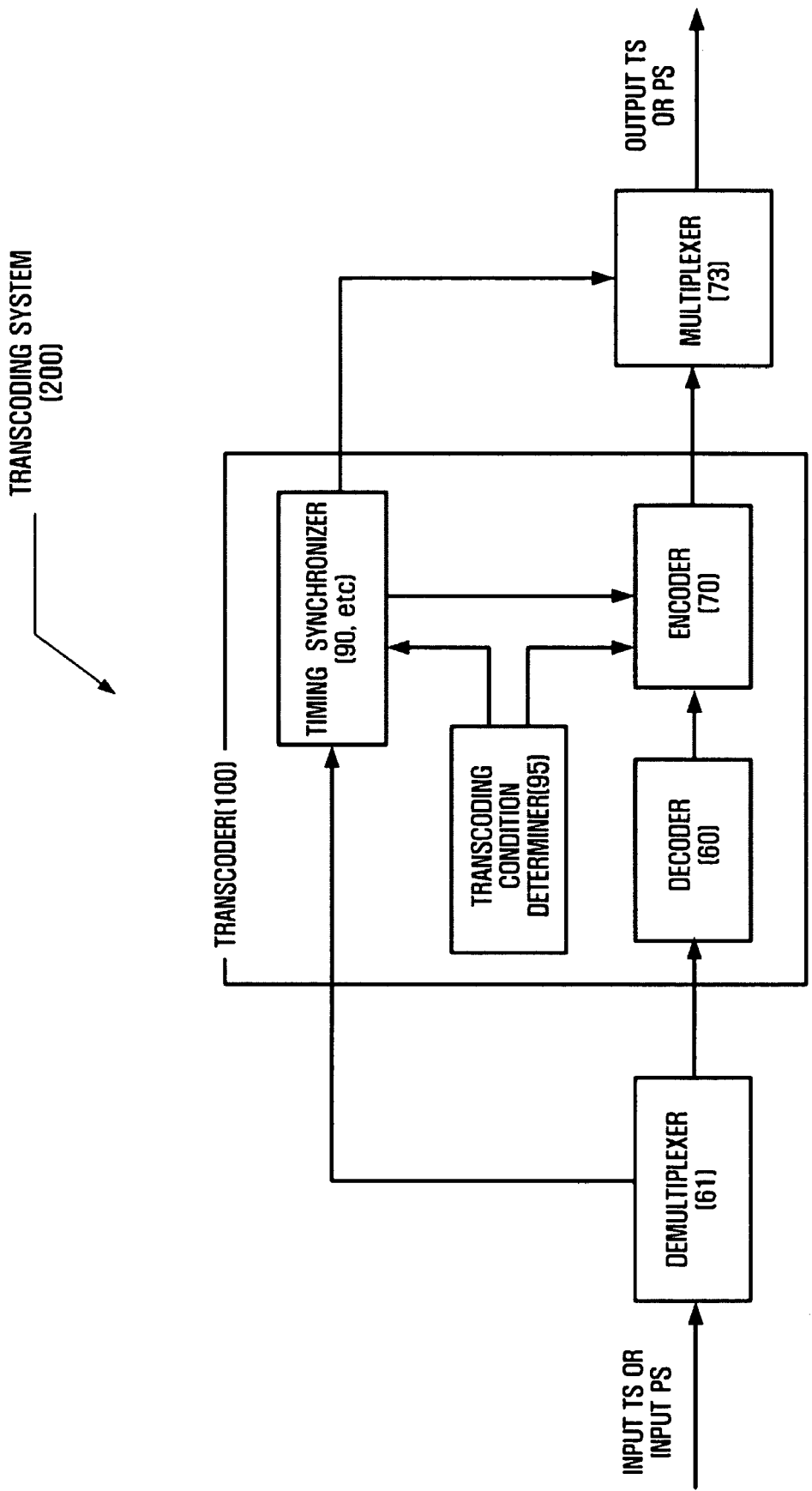
FIG. 1 is a schematic block diagram of a transcoding system according to an exemplary embodiment of the present invention.

The present invention now will be described more fully with reference to the accompanying drawings, in which exemplary embodiments of the invention are shown. This invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. The spirit and scope of the invention is defined by the appended claims. In the drawings, the same reference numerals denote the same member.

FIG. 1 is a schematic block diagram of a transcoding system 200 according to an exemplary embodiment of the present invention. Referring to FIG. 1, the transcoding system 200 includes a transcoder 100. The transcoder 100 includes a timing synchronizer 90 (190, 290, 390, or 490), a decoder 60, and an encoder 70. The transcoding system 200 may further include a demultiplexer 61 and a multiplexer 73.

The demultiplexer 61 receives an input transport stream (TS) or program stream (PS), extracts timing parameters from the input TS or PS, and transmits the extracted timing parameters to the timing synchronizer 90. The demultiplexer 61 also extracts video data, that was previously compressed in a predetermined manner, from the input TS or PS and transmits the extracted video data to the decoder 60. Here, the timing parameters include a presentation time stamp (PTS), a decode time stamp (DTS), and a program clock reference (PCR).

The timing synchronizer 90 keeps the timing parameters received from the demultiplexer 61 intact so that they still can be synchronized with segmentation metadata even after the video data has undergone a transcoding process, and transmits the timing parameters to the encoder 70 and the multiplexer 73.

The decoder 60 restores the compressed video data received from the demultiplexer 61 to a video sequence using a predetermined decoding method and provides the video sequence to the encoder 70.

The encoder 70 compresses the video sequence received from the decoder 60 according to predetermined conditions set by a transcoding condition determiner 95, records the timing parameters received from the timing synchronizer 90 in the compressed video sequence, and transmits the resultant compressed video sequence to the multiplexer 73.

The transcoding condition determiner 95 determines transcoding conditions suitable for an end user environment and provides the determined transcoding conditions to the encoder 70 and the timing synchronizer 90. The transcoding conditions include video quality, resolution, a bit rate, and a video frame rate.

The multiplexer 73 multiplexes the video sequence received from the encoder 70 and segmentation metadata, thereby creating an output TS or PS. The multiplexer 73 records the timing parameters received from the timing synchronizer 90 in a header of the output TS or PS. The segmentation metadata may have been extracted from the input TS or PS by the demultiplexer 61 or may have been provided by another metadata provider.

In the present invention, a stream input to the demultiplexer 61 may be a TS or PS, and a stream output from the multiplexer 73 may be a TS or PS. In addition, the multiplexer 73 may output a TS or PS regardless of whether the stream input to the demultiplexer 61 is a TS or PS.

However, the present invention will now be described taking a TS rather than a PS as an example for convenience of explanation. For example, in the following paragraphs, only a PCR will be described as a reference time indicator, but an SCR may also be used as the reference time indicator in a case where a stream input to or output from the transcoding system 200 is a PS. Even if a PCR is input to the transcoding system 200 as a reference time indicator, an SCR may be output from the transcoding system 200 as the reference time indicator, and vice versa.

Figure 2A:
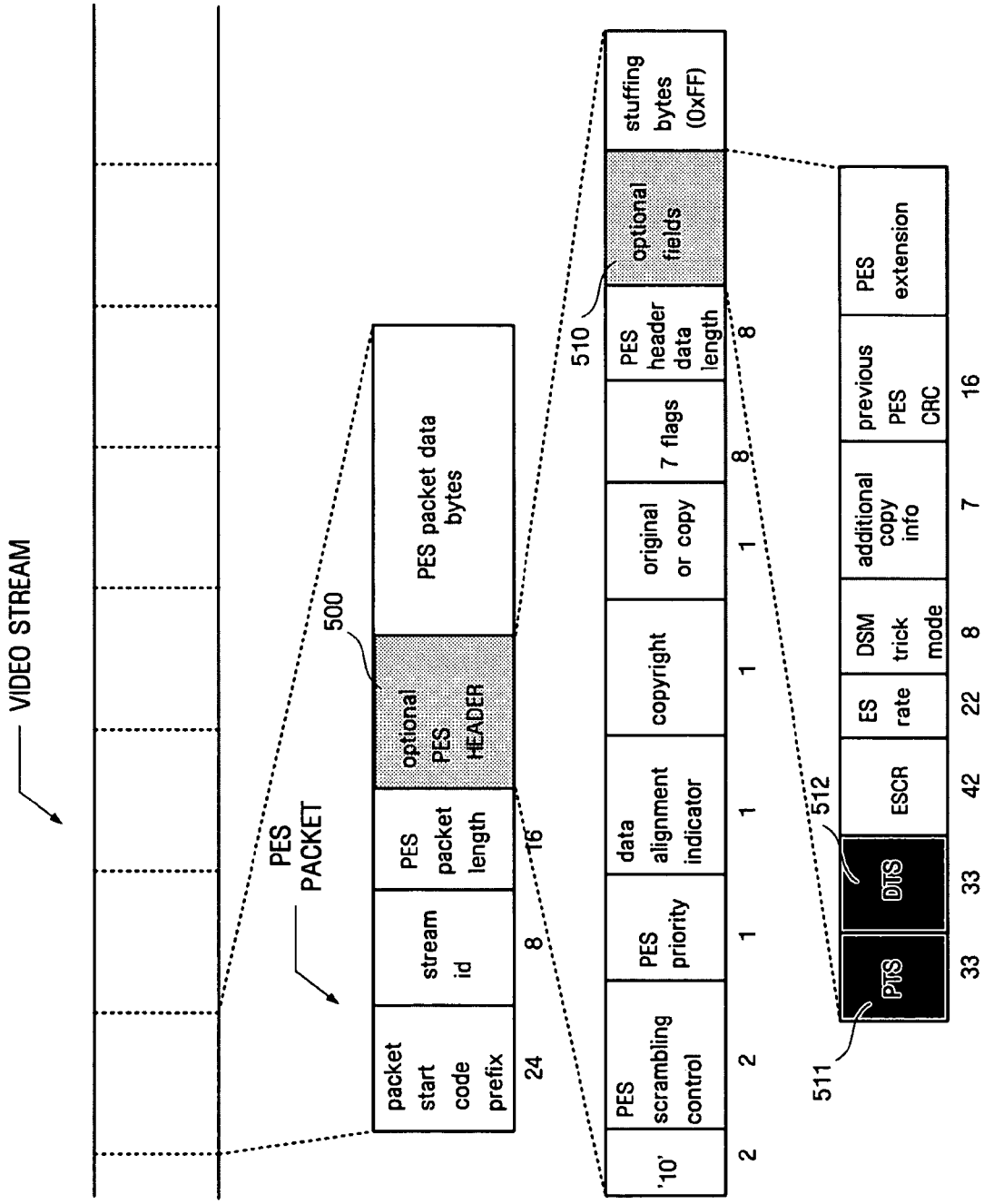
FIG. 2A is a diagram illustrating the format of a packetized elementary stream (PES) packet.
Figure 2B:
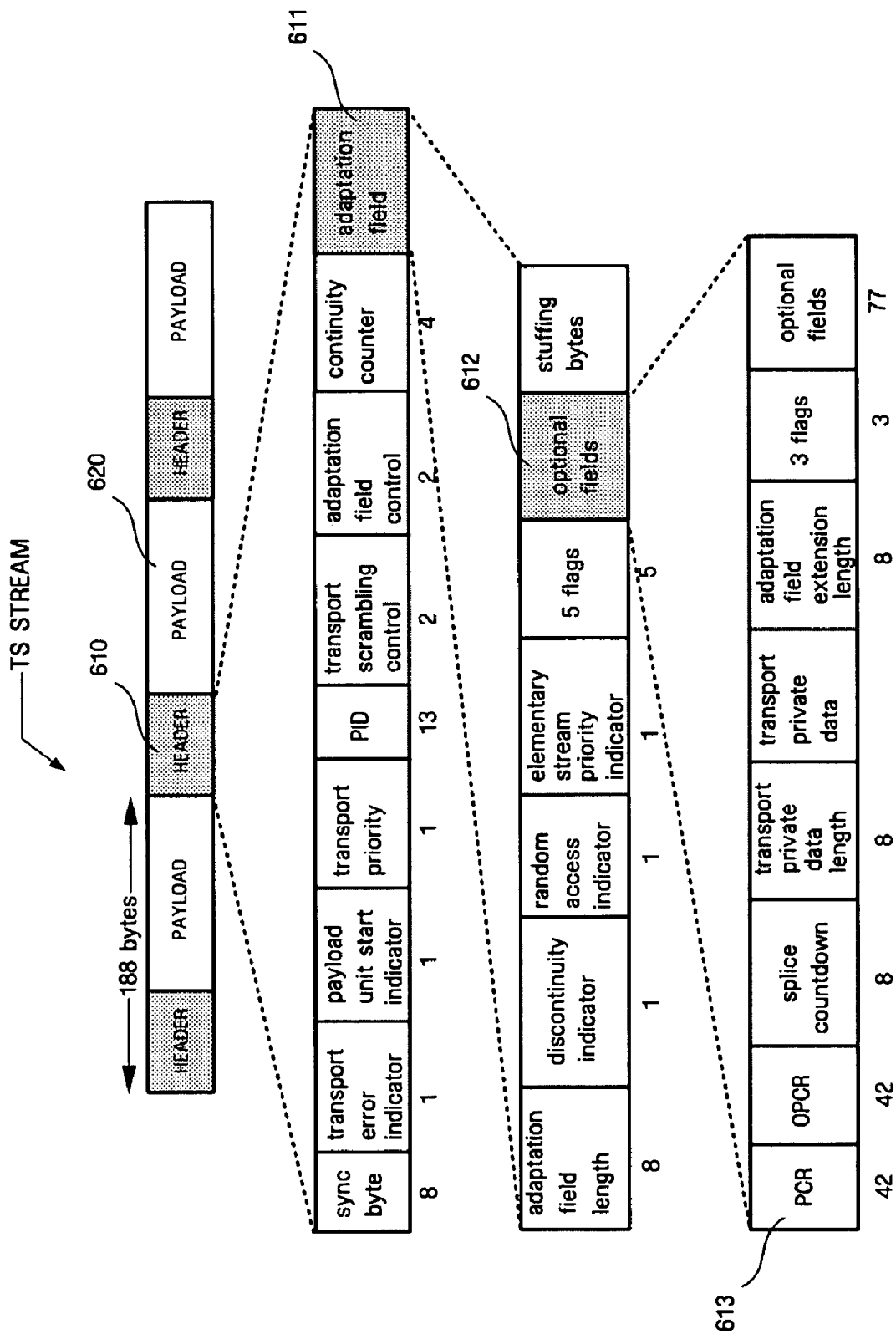
FIG. 2B is a diagram illustrating the format of a transport stream (TS)

FIGS. 2A and 2B illustrate an MPEG-2 packetized elementary stream (PES) packet and an MPEG-2 TS, respectively. Referring to FIG. 2A, an MPEG-2 video stream, which is compressed using an MPEG-2 encoder, is packetized into PES packets each having a predetermined size. Each of the PES packets includes a PES header and a PES packet data field. The PES header includes an optional PES header 500.

The optional PES header 500 includes an optional field 510. The optional field 510 includes a PTS field 511 and a DTS field 512. PTS information is recorded in the PTS field 511, while DTS information is recorded in the DTS field 512.

Referring to FIG. 2B, a TS, which is formed through a multiplexing process, is 188 bytes long and includes a header 610 and a payload 620. A PES packet, a program association table (PAT), and a program map table (PMT) are contained in the payload 620.

The header 610, which starts with sync bytes, includes various fields, such as an adaptation field 611. The adaptation field 611 includes an optional field 612, and the optional field 612 includes a PCR field 613. PCR information, which is reference time information, is recorded in the PCR field 613.

Figure 3:
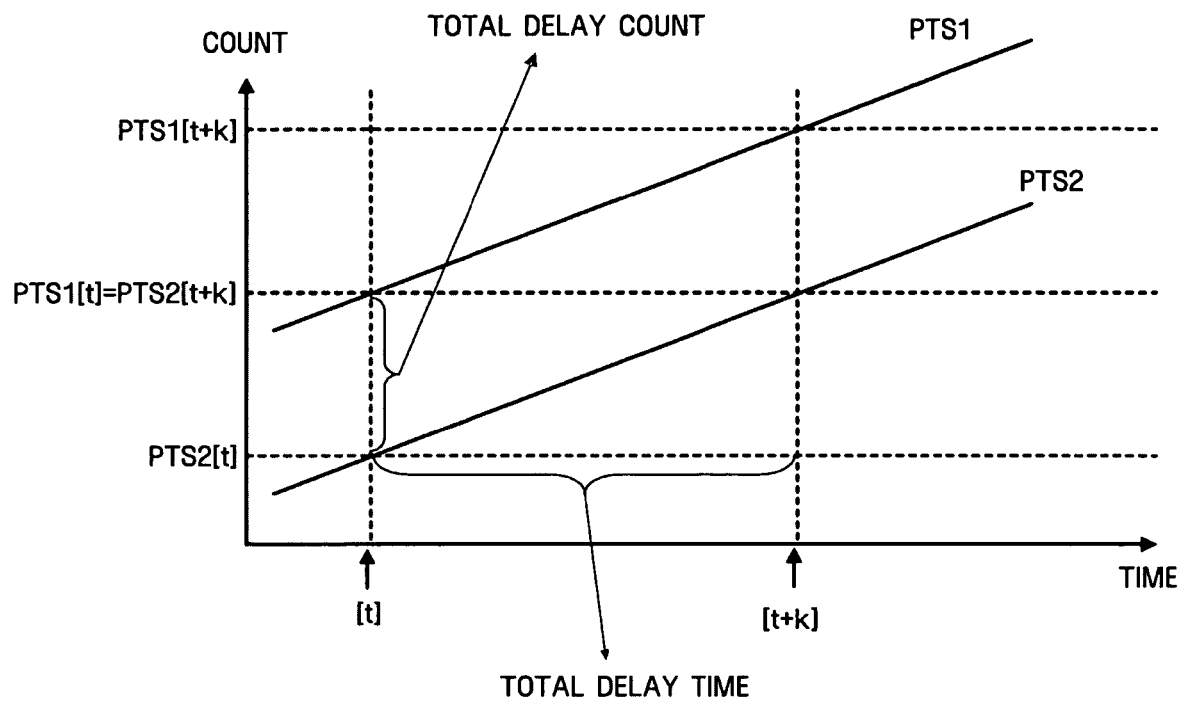
FIG. 3 is a graph illustrating a method of maintaining a PTS to be equal to a PCR after a transcoding process according to an exemplary embodiment of the present invention.
Figure 4:
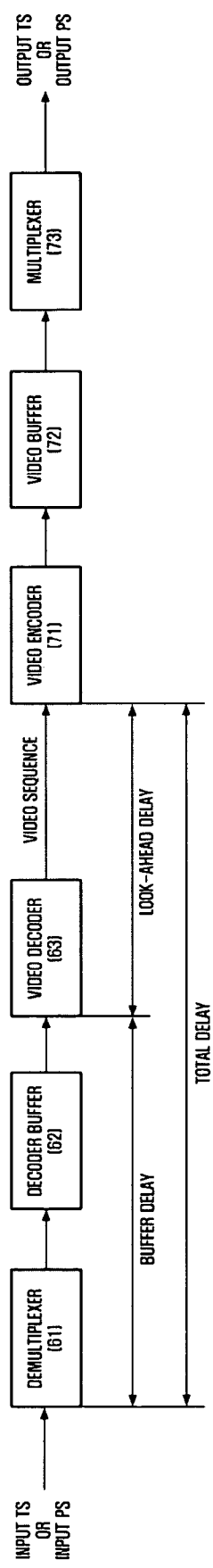
FIG. 4 is a diagram illustrating total delay time.

FIG. 3 is a graph illustrating a method of maintaining a PTS to be equal to a PCR after performing a transcoding process according to an exemplary embodiment of the present invention. Referring to FIG. 3, PTS1[t] represents a value of PTS1 at a moment t of time, PTS2[t+k] represents a value of PTS2 at a moment t+k of time, and k represents a time gap, between the time when a predetermined video frame is input to a transcoder and the time when the predetermined video frame is decoded and re-encoded i.e., the total delay time occurring in the transcoder. The total delay time k is the sum of look-ahead delay and buffer delay, as shown in FIG. 4. A number of clock counts corresponding to the total delay time k may be defined as a total number of delay counts.

In FIG. 3, PTS1[t]=PTS2[t+k]. In other words, a video frame, which was encoded at t to have PTS1, should be re-encoded at t+k to have PTS2, which can be expressed by Equation (1) below:

$$PTS1[t]=PTS2[t]+\text{total number of delay counts}$$

$$PCR1[t]=PTS1[t]-c$$

$$PCR2[t]=PTS2[t]-c \quad (1)$$

wherein c represents a predetermined constant. Therefore, the total number of delay counts can be expressed by Equation (2) below:

$$\text{Total number of delay counts}$$

$$=PTS1[t]-PTS2[t]$$

$$=PCR1[t]+c-(PCR2[t]-c)$$

$$=PCR1[t]-PCR2[t] \quad (2)$$

wherein PTS2[t] and PCR2[t] can be obtained using Equation (3) below:

$$PTS2[t]=PTS1[t]-\text{total number of delay counts}$$

$$PCR2[t]=PCR1[t]-\text{total number of delay counts} \quad (3)$$

In order to precisely correct a PTS, as shown in Equation (3), a total number of delay counts between the time when a video frame having PTS1[t] is input to a transcoder and the time when the input video frame is re-encoded should be defined. In order to determine the total number of delay counts, the total delay time k should be determined first. As described above, the total delay time k is a time gap between the time when a predetermined video frame is demultiplexed by the demultiplexer 61 and the time when the demultiplexed video frame is input to the video encoder 71, i.e., the sum of buffer delay and look-ahead delay.

Supposing that f represents an original video frame rate (video frame/sec), M represents a system clock frequency for forming a PTS (e.g., 27 MHz), and N represents the number of video frames transcoded during the total delay time k, a PTS interval between frames can be expressed by M/f. The total number of delay counts has a discrete value, which is a multiple of M/f. Therefore, the total number of delay counts and the total delay time k can be expressed by Equation (4) as follows:

$$\text{Total number of delay counts}=M/f \times N \quad (4)$$

The total number of delay counts, which is calculated using Equation (4), will be used in exemplary embodiments of the present invention, which are illustrated in FIGS. 5 through 8.

Figure 5:
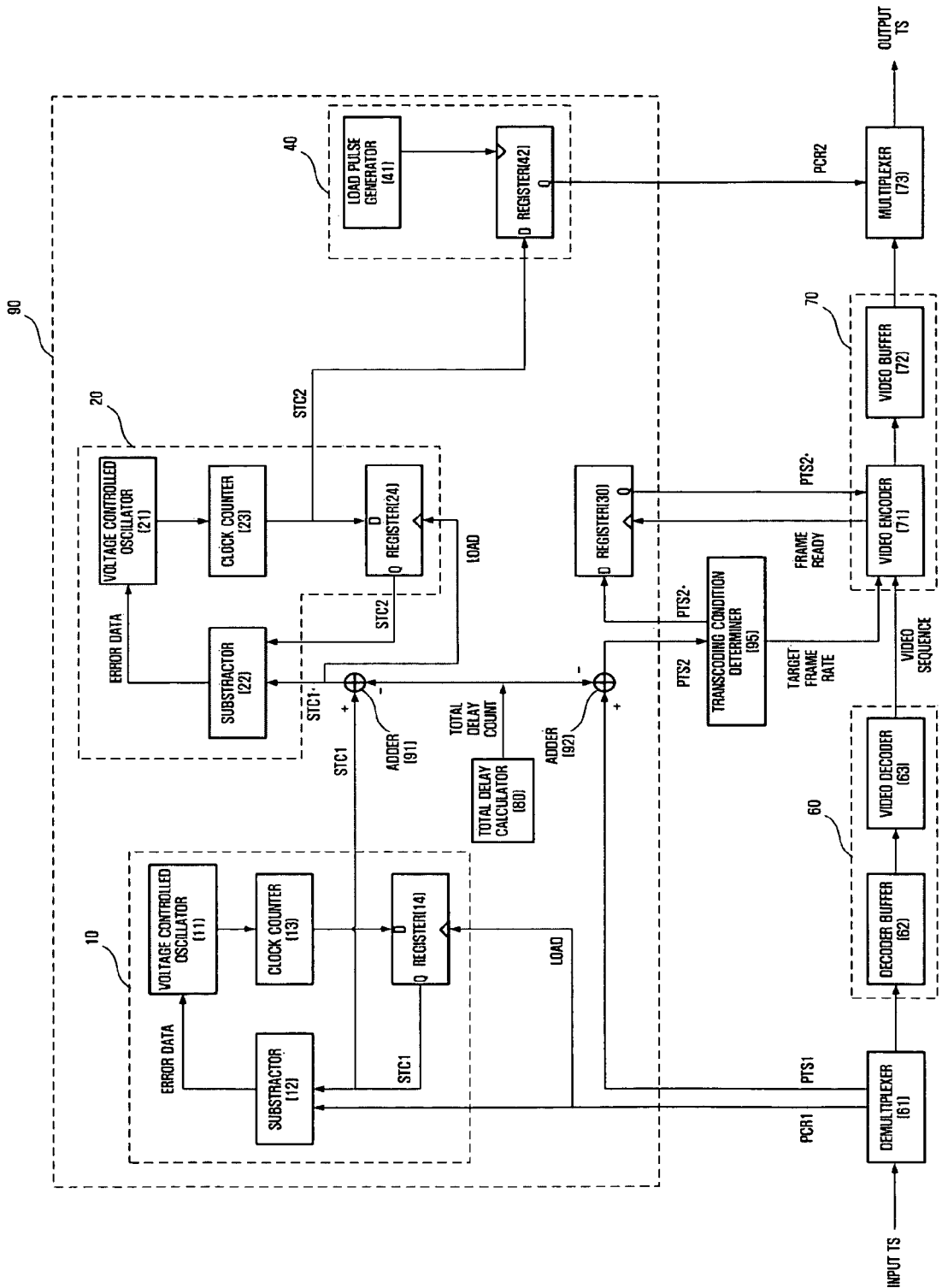
FIG. 5 is a block diagram of a transcoding system according to a first exemplary embodiment of the present invention.

FIG. 5 is a detailed block diagram of a transcoding system 200 according to a first exemplary embodiment of the present invention. Referring to FIG. 5, the timing synchronizer 90 includes a first phase locked loop (PLL) 10, a second PLL 20, a total delay calculator 80, adders 91 and 92, a register 30, and a PCR generator 50.

A TS input to the transcoding system 200 is demultiplexed into PES packets by the demultiplexer 61. The PES packets are encoded into video data, and the video data is output to a decoder buffer 62. The decoder buffer 62 temporarily stores the video data and transmits the video data to a video decoder 63 in a first-in-first-out (FIFO) manner. The video decoder 63 reconstructs a video sequence from the video data encode in a video encoder. The demultiplexer 61 extracts PCR1 from the input TS and transmits the extracted PCR1 to the first PLL 10. The demultiplexer 61 extracts PTS1 from the input TS and transmits the extracted PTS1 to the adder 92.

A typical PLL is an electric circuit that compares the phase of an input signal with the phase of a reference signal and synchronizes the input signal with the reference signal. More specifically, the typical PLL compares an input clock signal with a feedback clock signal and controls a clock signal of an oscillator based on the comparison result until a rising edge of the input clock is aligned with a rising edge of the feedback clock signal.

The first PLL 10 serves almost the same functions as the typical PLL. More specifically, the first PLL 10 adjusts a system clock signal-based on PCR1 input from the demultiplexer 61 and outputs STC1 by using the adjusted system clock signal.

More specifically, PCR1 extracted from the input TS is transmitted to the subtractor 12 and the register 14. The subtractor 12 subtracts STC1 output from the register 14 from PCR1 and transmits error data obtained as the subtraction result to a voltage controlled oscillator 11. The voltage controlled oscillator 11 adjusts the frequency of a system clock signal that is output therefrom to be equal to the frequency, e.g., 27 MHz, of a system clock signal of a transmitting party, i.e., a source encoder, by using the error data, outputs the adjusted system clock signal, and correctly restores a reference time based on PCR1. The system clock signal output from the voltage controlled oscillator 11 is input to a clock counter 13. The clock counter 13 counts the system clock signal received from the voltage controlled oscillator 11, i.e., calculates STC1, and outputs STC1 to a register 14. When the register 14 receives a load signal indicating the timing of supply of PCR1, it feeds STC1 back to the subtractor 12.

The total delay calculator 80 calculates total delay time, i.e., a total number of delay counts, by summing up buffer delay and look-ahead delay, as shown in Equation (4) above.

The adder 91 inverses the sign of STC1, which is output from the register 14, and the sign of the total number of delay counts, which is calculated by the total delay calculator 80, and sums up the inversion results, thereby obtaining STC1*. Thereafter, the adder 91 transmits STC1* to the second PLL 20.

The second PLL 20, which, like the first PLL 10, serves almost the same functions as the typical PLL, adjusts a system clock signal by using STC1* input thereto as an input clock signal and outputs STC2 by using the adjusted system clock signal.

More specifically, STC1* obtained by the adder 91 is provided to a subtractor 22 and a register 24. The subtractor 22 obtains error data by subtracting STC2 output from the register 24 from STC1* and transmits the error data to a voltage controlled oscillator 21. The voltage controlled oscillator 21 adjusts the frequency of a system clock signal that is output therefrom to be equal to the frequency, e.g., 27 MHz, of the system clock signal output from the transmitting party, i.e., the first PLL 10, and correctly restores the reference time based on STC1*.

The system clock signal output from the voltage controlled oscillator 21 is input to a clock counter 23. Then, the clock counter 23 counts the system clock signal received from the voltage controlled oscillator 21, i.e., calculates STC2. Thereafter, the clock counter 23 outputs STC2 to the register 24. When the register 24 receives a load signal indicating the timing of supply of STC1*, it feeds STC2 back to the subtractor 12.

A PCR generator 40 receives STC2 from the clock counter 23, generates PCR2 according to the frequency of a predetermined clock signal, and transmits PCR2 to the multiplexer 73. The PCR generator 40 includes load pulse generator 41 and a register 42. The register 42 receives STC2 from the clock counter 23. The register 42 sets STC2, which is input thereto when a clock signal having a frequency of 10 Hz is input thereto from the load pulse generator 41, as PCR2 and provides PCR2 to the multiplexer 73. The multiplexer 73 records PCR2 having a predetermined frequency (e.g., 10 Hz) in a header of an output TS.

The adder 92 inverses the sign of PTS 1 output from the demultiplexer 61 and the sign of the total number of delayed counts calculated by the total delay calculator 80 and sums up the inversion results, thereby obtaining PTS2. Thereafter, the adder 92 provides PTS2 to the transcoding condition determiner 95.

The transcoding condition determiner 95 receives PTS2 from the adder 92, determines transcoding conditions suitable for an end user environment, and adjusts PTS2 according to the determined transcoding conditions, thereby obtaining PTS2*. Thereafter, the transcoding condition determiner 95 transmits PTS2* to a register 30 and transmits a target video frame rate, which has been reset according to the determined transcoding conditions, to the video encoder 71.

If an original video frame rate is kept intact even though other parameters, i.e., a picture quality, resolution, and a bit rate, have been changed according to the determined transcoding conditions, PTS does not need to be changed, in which case, the transcoding condition determiner 95 outputs PTS2, instead of PTS2*, to the register 30 and sets the original video frame rate as the target video frame rate.

However, if the transcoding condition determiner 95 decides to change the original video frame rate by obtaining new video frames by interpolating between existing video frames or skipping some of the existing video frames, a PTS of each of the existing video frames cannot be used as it is and must be changed. The adjustment result, i.e., PTS2* can be obtained using Equation (5) below:

$$PTS2^*(i)=PTS\_start+\Delta PTS\times(f1/f2)\times i \quad (5)$$

wherein f1 represents an original video frame rate, f2 represents a reset video frame rate, PTS_start represents a PTS2 value obtained when resetting of the original video frame rate initiates, $\Delta PTS$ represents the number of clocks counted between video frames, i.e., a difference between PTS2 values of video frames, and i represents a serial number allotted to each of the video frames according to an order in which the video frames are presented.

In the case of increasing an original video frame rate, which is not a matter of frequent occurrence, a PTS should be adapted to the increased video frame rate. The original video frame rate can be increased by creating new video frames and interpolating the new video frames between existing video frames. This video frame interpolation process is performed before the video encoder 71, which has received the target video frame rate from the transcoding condition determiner 95, compresses the existing video frames using a predetermined video compression method. Thereafter, PTS2* of each of the resultant video frames, including the existing ones and the newly created ones, is obtained using Equation (5) above.

In the case of decreasing the original video frame rate, one in every predetermined number of existing video frames may be skipped. Thereafter, skipped video frames may be stripped of their PTSs, and the rest of the existing video frames may be allowed to have their original PTSs. Alternatively, a predetermined percentage of the existing video frames may be skipped, new video frames are interpolated among the rest of the existing video frames, and the resultant video frames are encoded, in which case, PTS2* of each of the resultant video frames can be obtained using Equation (5) above.

A DTS may be changed in various manners depending on how a corresponding video frame has been encoded. A changed DTS may be obtained in the same manner that is used to obtain PTS2*.

Referring to FIG. 5, the video encoder 71 receives a video sequence from the video decoder 63, creates new video frames by performing interpolation based on the target video frame rate received from the transcoding condition determiner 95, and transmits a predetermined load signal indicating that the creation of the video frames to be interpolated is completed to the register 30 when the video frames to be interpolated are ready to be used in a video frame interpolation process. The video encoder 71 receives PTS2* from the register 30, records PTS2* in a header of each video frame, compresses resultant video frames on a predetermined coding unit basis, for example, on a group-of-pictures (GOP)-by-GOP basis, by using a predetermined video compression method and transmits the compressed video frames to the multiplexer 73 via a video buffer 72.

The multiplexer 73 records PCR2 received from the PCR generator 40 in a header of the output TS and records a video stream, which is comprised of the compressed video streams received from the video encoder 71, in a payload of the output TS on a predetermined unit basis, thereby generating the output TS.

The register 30 receives PTS2* from the transcoding condition determiner 95 and provides PTS2* to the video encoder 71 when it receives the predetermined load signal from the video encoder 71.

Figure 6:
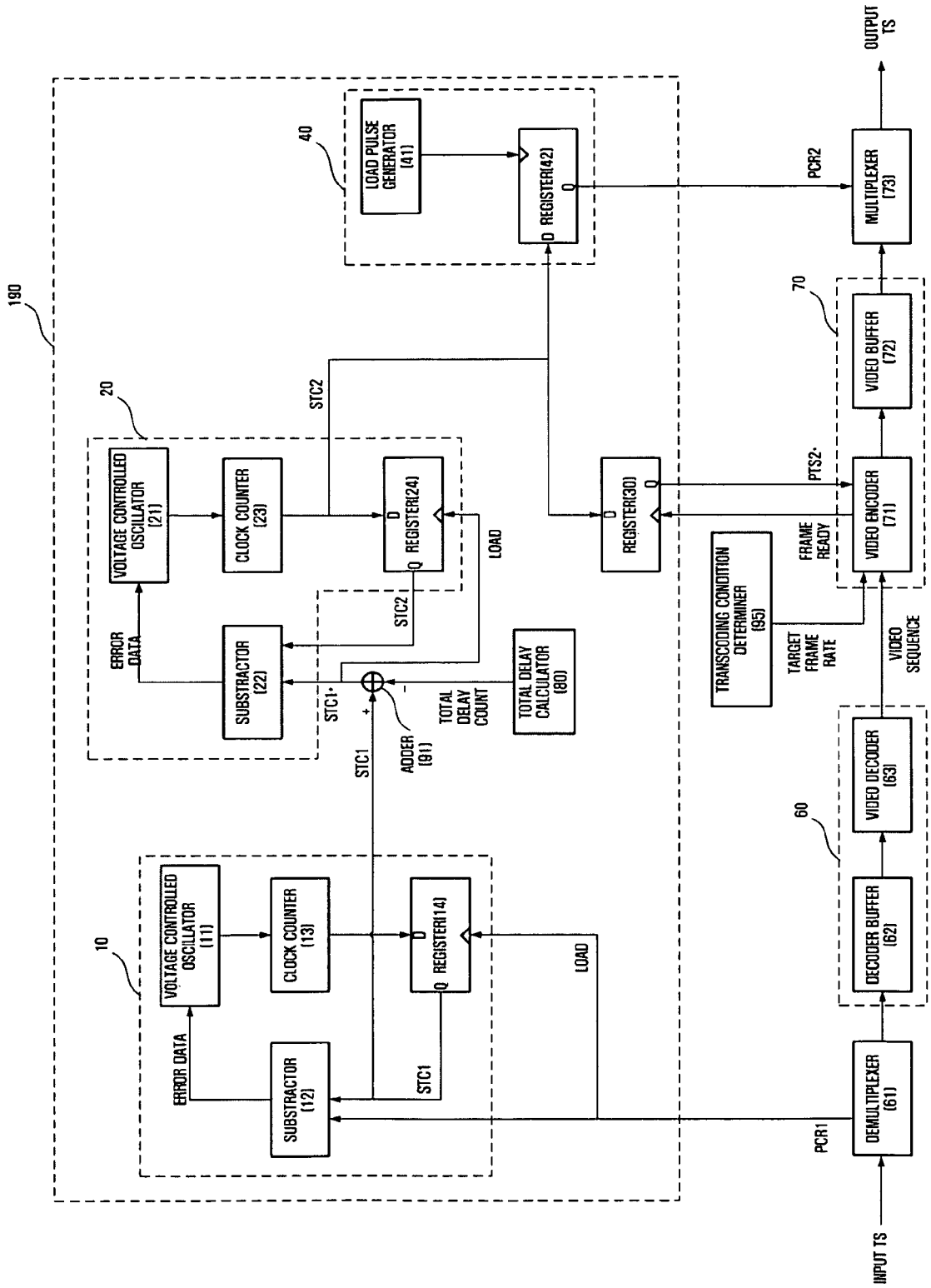
FIG. 6 is a block diagram of a transcoding system according to a second exemplary embodiment of the present invention.

FIG. 6 is a block diagram of a transcoding system 200 according to a second exemplary embodiment of the present invention. The second exemplary embodiment of the present invention provides the same effects as the first exemplary embodiment of the present invention by decreasing an STC by a total number of delayed counts, rather than adjusting a inputted PTS.

Referring to FIG. 6, a timing synchronizer 190 may include a first PLL 10, a second PLL 20, a total delay calculator 80, an adder 91, a register 30, and a PCR generator 40.

A demultiplexer 61 extracts PCR1 from an input TS and transmits PCR1 to the first PLL 10. The demultiplexer 61 extracts PTS1 from the input TS and transmits PTS1 to the adder 92.

The first PLL 10, which is a typical PLL, adjusts an STC by using PCR1 as an input clock signal and outputs STC1 as the adjustment result.

More specifically, PCR1 extracted from the input TS is provided to a subtractor 12 and a register 14. The subtractor 12 subtracts STC1 output from the register 14 from PCR1, thereby obtaining error data. Thereafter, the subtractor 12 transmits the error data to a voltage controlled oscillator 11. The voltage controlled oscillator 11 adjusts the frequency of the system clock signal to be equal to the frequency, e.g., 27 MHz, of a system clock signal output from a transmitting party, i.e., a source encoder, by using the error data and restores a reference time based on PCR1.

The system clock signal output from the voltage controlled oscillator 11 is input to a clock counter 13. The clock counter 13 counts the system clock signal, i.e., calculates STC1. STC1 is input to the register 14 and is fed back to the subtractor 12 from the register 14 when the register 14 receives a load signal indicating the timing of supply of PCR1.

The total delay calculator 80 calculates total delay time, i.e., a number of delayed counts, by calculating buffer delay and look-ahead delay and summing up the buffer delay and the look-ahead delay. The adder 91 inverses the sign of STC output from the register 14 and the sign of the total number of delayed counts calculated by the total delay calculator 80 and sums up the inversion results, thereby obtaining STC1*. Thereafter, the adder 91 transmits STC1* to the second PLL 20, which, like the first PLL 10, is a typical PLL.

More specifically, STC1* output from the adder 91 is transmitted to a subtractor 22 and a register 24. The subtractor 22 obtains error data by subtracting STC2 output from the register 24 from STC1* and transmits the error data to a voltage controlled oscillator 21. The voltage controlled oscillator 21 adjusts the frequency of a system clock signal to be output therefrom to be equal to the frequency, e.g., 27 MHz, of the system clock signal output from the transmitting party, i.e., the first PLL 10, and correctly restores the reference time based on STC1*.

The system clock signal output from the voltage controlled oscillator 21 is input to a clock counter 23. The clock counter 23 counts the system clock signal received from the voltage controlled oscillator 21, i.e., calculates STC2. STC2 is input to a register 23 and is fed back to the subtractor 22 when the register 23 receives a load signal indicating the timing of supply of STC1*.

The PCR generator 40 receives STC2 from the clock counter 23, generates PCR2 according to the frequency of a predetermined clock signal, and transmits PCR2 to the multiplexer 73. More specifically, the PCR generator 40 includes a load pulse generator 41 and a register 42. The register 42 receives STC2 from the clock counter 23, sets STC, which is input when it receives a clock signal having a frequency of 10 Hz from the load pulse generator 41, as PCR2, and provides PCR2 to the multiplexer 73. Then, the multiplexer 73 records PCR2 having a predetermined frequency, e.g., 10 Hz, in a header of an output TS.

The transcoding condition determiner 95 determines transcoding conditions suitable for an end user environment and transmits a target video frame rate changed according to the transcoding conditions to the video encoder 71. In the case of increasing video frame rate, it is necessary to create new video frames and interpolate the newly created video frames between existing video frames, a process which is performed before the video encoder 71, which has received the target video frame rate from the transcoding condition determiner 95, compresses the existing video frames using a predetermined video compression method.

In the case of decreasing the video frame rate, one in every predetermined number of existing video frames may be skipped, in which case, a video frame interpolation process is unnecessary. However, if a predetermined percentage of the existing video frames are skipped to decrease the original video frame rate, newly created video frames should be interpolated between the remaining video frames.

Referring back to FIG. 6, the video encoder 71 receives a video sequence, creates new video frames by performing interpolation based on the target video frame rate received from the transcoding condition determiner 95, and transmits a predetermined load signal indicating that the creation of the video frames to be interpolated is completed to the register 30 when the video frames to be interpolated are ready to be used in a video frame interpolation process. The video encoder 71 receives PTS2* from the register 30, records PTS2* in a header of each video frame, compresses resulting video frames on a predetermined coding unit basis by using a predetermined video compression method, and transmits the compressed video frames to the multiplexer 73 via a video buffer 72.

The multiplexer 73 records PCR2 received from the PCR generator 40 in a header of the output TS and records the compressed video streams, received from the video encoder 71, in a payload of the output TS on a predetermined unit basis, thereby generating the output TS.

The register 30 receives STC2 from the transcoding condition determiner 95, sets STC2 as a final PTS, i.e., PTS2*, and transmits PTS2* to the video encoder 71 when it receives the predetermined load signal from the video encoder 71.

Figure 7:
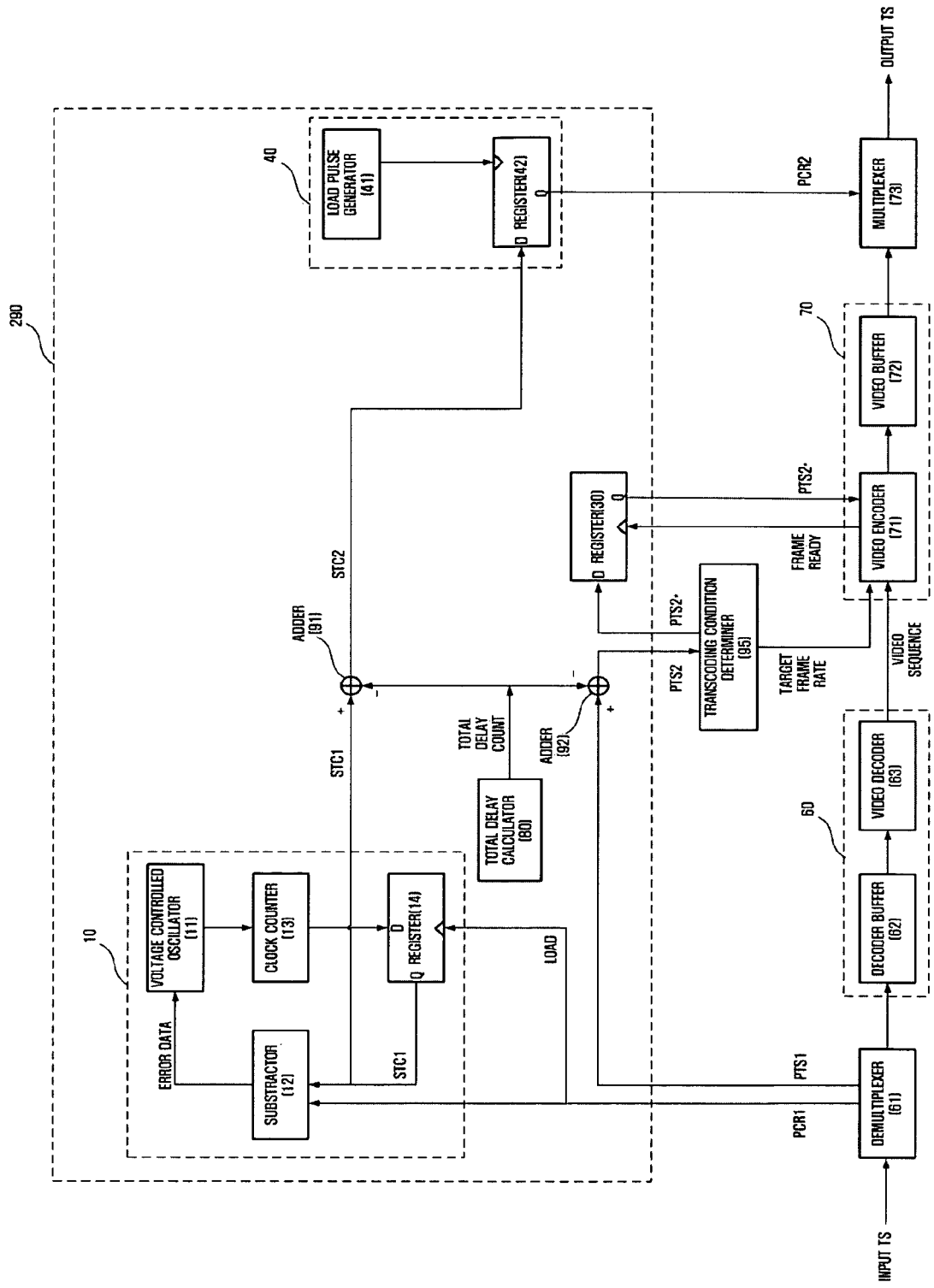
FIG. 7 is a block diagram of a transcoding system according to a third exemplary embodiment of the present invention.

FIG. 7 is a block diagram of a transcoding system 200 according to a third exemplary embodiment of the present invention. The transcoding system 200 includes only one PLL, while its counterpart in the first exemplary embodiment of the present invention includes two PLLs, i.e., one for the video decoder 63 and the other for the video encoder 71.

In other words, the transcoding system 200 according to the third exemplary embodiment of the present invention is the same as the transcoding system 200 according to the first exemplary embodiment of the present invention except that it does not include the second PLL 20 shown in FIG. 5. Therefore, in the present exemplary embodiment, an output of the adder 91, i.e., a result of subtracting a total number of delayed counts from STC1, is directly input to a register 42 without passing through the second PLL 20 shown in FIG. 5. As stated above, it should be apparent to one skilled in the art that the exemplary embodiment can be effected by the same method as in the first exemplary embodiment.

Figure 8:
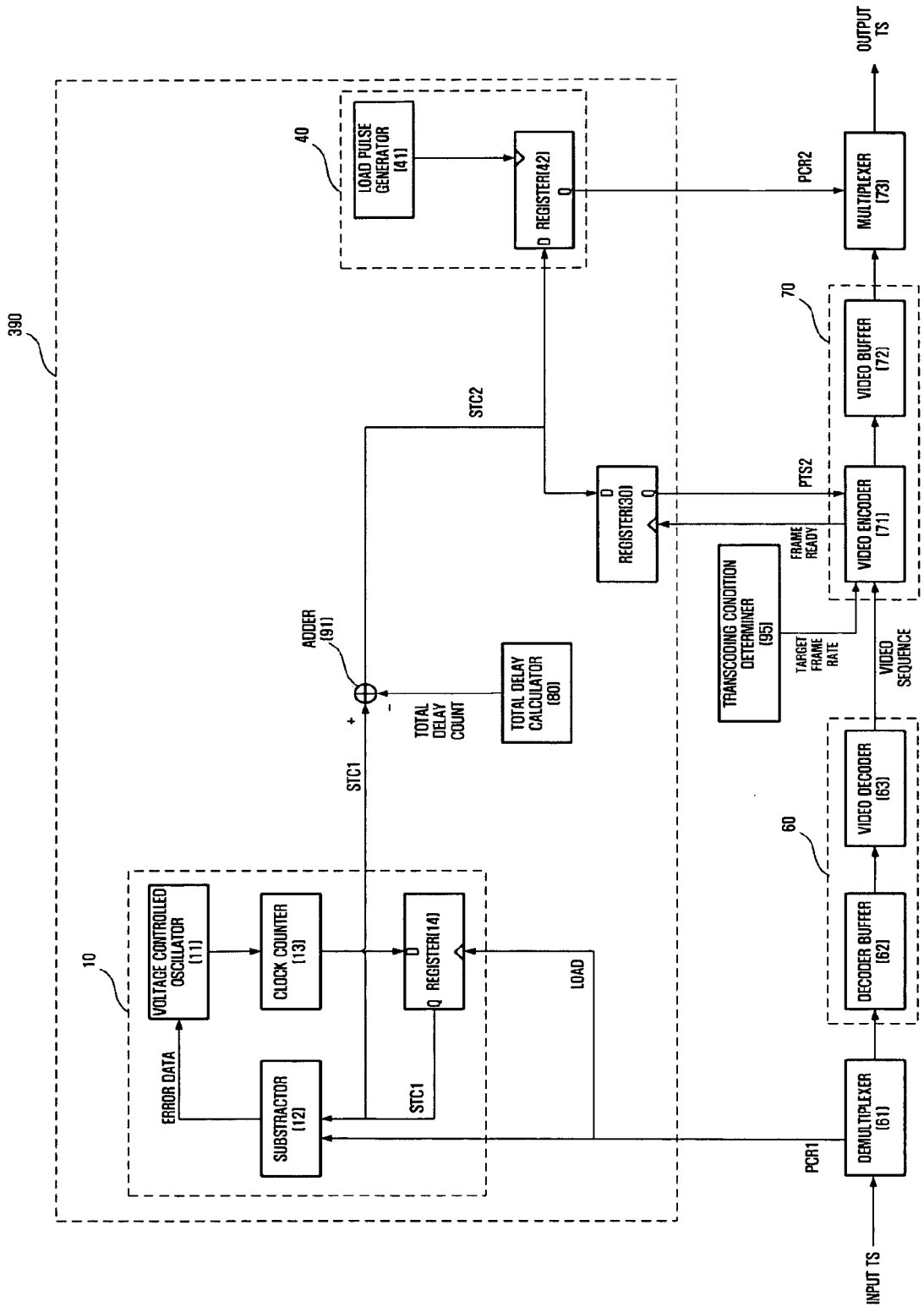
FIG. 8 is a block diagram of a transcoding system according to a fourth exemplary embodiment of the present invention.

FIG. 8 is a block diagram of a transcoding system 200 according to a fourth exemplary embodiment of the present invention. The transcoding system 200 is the same as its counterpart in the second exemplary embodiment of the present invention except that it includes one PLL rather than two PLLs.

More specifically, the transcoding system 200 does not include the second PLL 20 of FIG. 6. Therefore, in the present exemplary embodiment, an output of the adder 91, i.e., a result of subtracting a total number of delayed counts from STC1, is directly input to registers 30 and 42 without passing through the second PLL 20 of FIG. 6.

Figure 9:
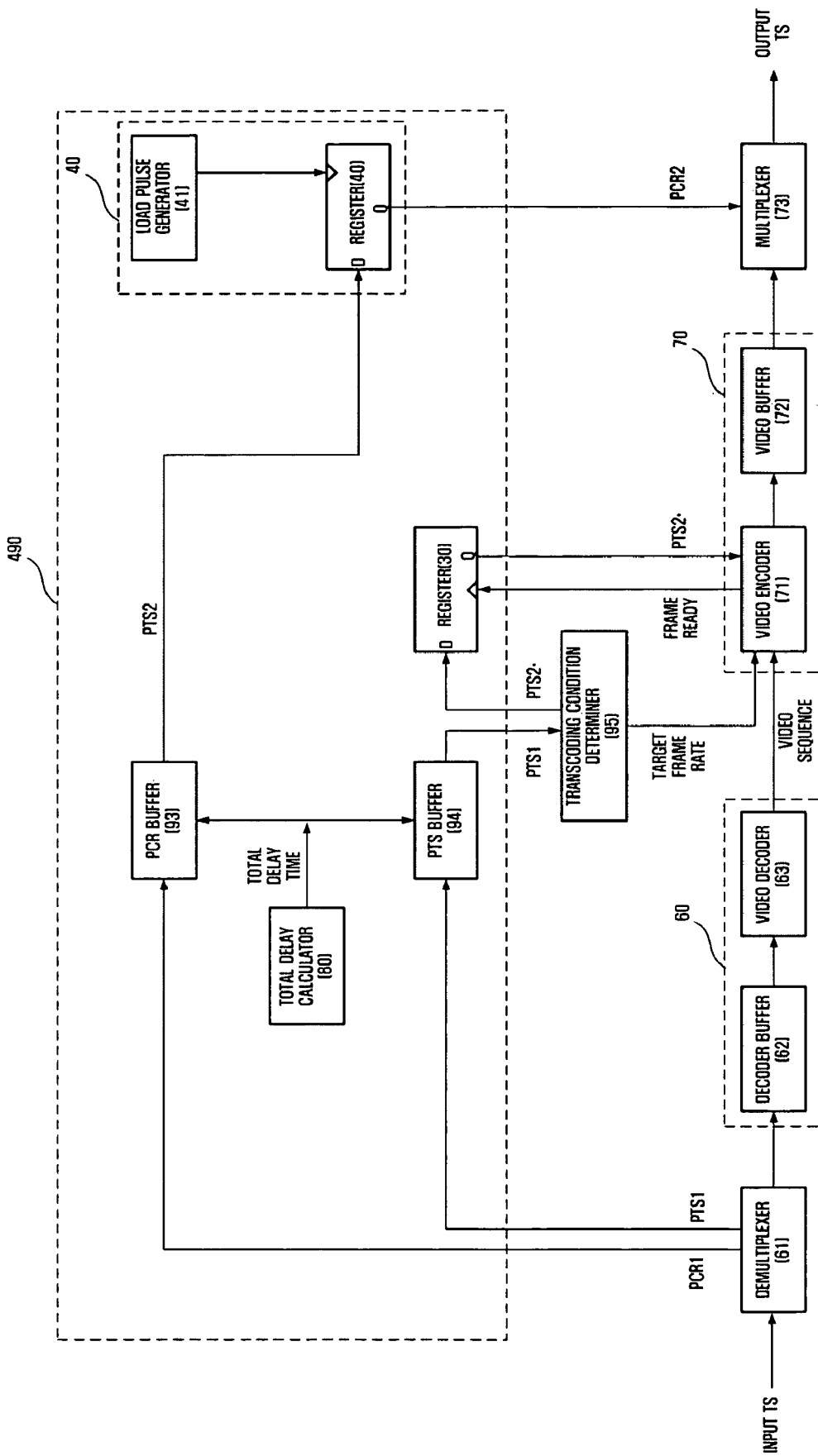
FIG. 9 is a block diagram of a transcoding system according to a fifth exemplary embodiment of the present invention.

FIG. 9 is a block diagram of a transcoding system according to a fifth exemplary embodiment of the present invention. The transcoding system 200, unlike its counterparts in all of the previous exemplary embodiments of the present invention, respectively stores a PCR and a PTS in buffers and uses the PCR and the PTS in a video encoding process without modifying them.

The transcoding system 200 includes a timing synchronizer 490, a demultiplexer 61, a decoder buffer 62, a video decoder 63, a video encoder 71, a video buffer 72, a multiplexer 73, and a transcoding condition determiner 95.

The timing synchronizer 490 includes a PCR buffer 93, a PTS buffer 94, a total delay calculator 80, a register 30, and a PCR generator 40.

The demultiplexer 61 extracts PCR1 from an input TS and transmits PCR1 to the PCR buffer 93. In addition, the demultiplexer 61 extracts PTS1 from the input TS and transmits PTS1 to the PTS buffer 94.

The total delay calculator 80 calculates total delay time using Equation (4) above and provides the calculation result to the PCR buffer 93 and the PTS buffer 94.

The PCR buffer 93 stores PCR1 received from the demultiplexer 61 for the total delay time calculated by the total delay calculator 80 and then provides PCR1 to the register 40.

The PTS buffer 94 stores PTS1 received from the demultiplexer 61 for the total delay time and then provides PTS2 to the transcoding condition determiner 95.

The PCR generator 40 receives PCR2 from the PCR buffer 93, generates PCR2 according to the frequency of a predetermined clock signal, and transmits PCR2 to the multiplexer 73. The PCR generator 40 includes a load pulse generator 41 and a register 42. The register 42 receives PCR2 from the PCR buffer 93 and transmits PCR2 to the multiplexer 73 when it receives a clock signal having a frequency of 10 Hz. Then, the multiplexer 73 records PCR2 having a predetermined frequency (e.g., 10 Hz) in a header of an output TS.

The transcoding condition determiner 95 determines transcoding conditions suitable for an end user environment, adjusts PTS1 according to the transcoding conditions, transmits the adjustment result, i.e., PTS2*, to the register 30, and transmits a target video frame rate changed according to the transcoding conditions to the video encoder 71.

If an original video frame rate is kept intact even though other parameters, i.e., a picture quality, resolution, and a bit rate, all have been changed, PTS does not need to be changed. Therefore, the transcoding condition determiner 95 outputs PTS2, instead of PTS2*, to the register 30 and sets the original video frame rate as the target video frame rate.

However, if the transcoding condition determiner 95 decides to change the original video frame rate by interpolating between existing video frames or skipping some of the existing video frames, PTS2* of all frames containing interpolated frames, can be obtained using Equation (5) above.

In the case of increasing the original video frame rate, it is necessary to create new video frames and interpolate the new video frames between the existing video frames, a process which is performed right before the video encoder, which has received the target video frame rate, compresses the existing video frames using a predetermined video compression method. Thus, like in the above case, PTS2* of all frames containing interpolated frames, can be obtained using Equation (5) above.

In the case of decreasing the original video frame rate, one in every predetermined number of existing video frames may be skipped. Thereafter, skipped video frames may be stripped of their PTSs, and the rest of the existing video frames may be allowed to have their respective original PTSs. Alternatively, a predetermined percentage of the existing video frames may be skipped, new video frames are interpolated between the rest of the existing video frames, and the resultant video frames are encoded, in which case, PTS2* of each of the resultant video frames can be obtained using Equation (5) above.

The video encoder 71 receives a video sequence from the video decoder 63, and creates new video frames by performing interpolation based on the target video frame rate received from the transcoding condition determiner 95, if necessary. Then, the video encoder 71 transmits a predetermined load signal indicating that the creation of the video frames to be interpolated is completed to the register 30 when the video frames to be interpolated are ready to be used in a video frame interpolation process. The video encoder 71 receives PTS2* from the register 30, records PTS2* in a header of each video frame, compresses the existing video frames on a predetermined coding unit basis by using a predetermined video compression method and transmits the compressed video frames to the multiplexer 73 via a video buffer 72.

The multiplexer 73 records PCR2 received from the PCR generator 40 in a header of the output TS and records a video stream, which is comprised of the compressed video frames received from the video encoder 71, in a payload of the output TS on a predetermined unit basis, thereby generating the output TS.

The register 30 receives PTS2* from the transcoding condition determiner 95 and provides PTS2* to the video encoder 71 when it receives the predetermined load signal from the video encoder 71.

While the present invention has been particularly shown and described through exemplary embodiments thereof with reference to the accompanying drawings, it will be understood by those of ordinary skill in the art that various changes in form and details may be made therein without departing from the spirit and scope of the present invention as defined by the following claims. Therefore, the disclosed exemplary embodiments of the invention are used in a generic and descriptive sense only and not for purposes of limitation.

According to the present invention, it is possible to effectively solve the problem with a conventional apparatus using a segment browser, which fails to synchronize segmentation metadata with AV contents when converting an MPEG stream into another having a different bit rate, a different video frame rate, a different video frame size or a different compression type than the MPEG stream and storing the resulting stream.

What is claimed is:

1. A transcoding system that maintains timing parameters before and after performing a transcoding process, the transcoding system comprising:
    a demultiplexer which extracts from an input transport stream timing parameters and video data that is compressed in a predetermined manner;
    a timing synchronizer which adjusts the timing parameters so that the video data can be synchronized with segmentation metadata even after the transcoding process;
    a transcoding condition determiner which determines transcoding conditions suitable for an end user environment;
    an encoder which compresses a video sequence reconstructed from the video data according to the transcoding conditions determined by the transcoding condition determiner and records a presentation time stamp, which is one of the adjusted timing parameters, in the video sequence which is compressed; and
    a multiplexer which generates an output transport stream by multiplexing the video sequence and the segmentation metadata and records a program clock reference, which is one of the adjusted timing parameters, in a header of the output transport stream,
    wherein the timing synchronizer adds a system time count and an inverse signal of delay counts occurring in the transcoding system to obtain another system time count, and generates a program clock reference based on the obtained system time count to transmit the program clock reference to the multiplexer.

2. The transcoding system of claim 1, wherein the timing synchronizer comprises:

a total delay calculator which calculates a total delay time and a total number of delay counts occurring in the transcoding system;

a phase locked loop which receives a program clock reference PCR1 from the demultiplexer, adjusts a system clock, and outputs a system time count STC1 based on an adjusted system clock;

a first adder which obtains a system time count STC1* by inversing a signal of the system time count STC1 output from the phase locked loop and a sign of the total number of delay counts calculated by the total delay calculator and summing up inversion results, and outputs the system time count STC1*;

a program clock reference generator which receives the system time count STC1* from the first adder, generates a program clock reference PCR2 based on a frequency of a predetermined clock signal, and transmits the program clock reference PCR2 to the multiplexer; and a second adder which obtains a presentation time stamp PCR2 by inversing a sign of a presentation time stamp PTS1 output from the demultiplexer and the total number of delay counts calculated by the total delay calculator and summing up inversion results, and transmits the presentation time stamp PTS2 to the transcoding condition determiner.

3. The transcoding system of claim 1, wherein the timing synchronizer comprises:

a total delay calculator which calculates a total delay time and a total number of delay counts occurring in the transcoding system;

a first phase locked loop which receives a program clock reference PCR1 from the demultiplexer, adjusts a system clock, and outputs a system time count STC1 based on the adjusted system clock;

a first adder which obtains a system time count STC1* by inversing a signal of the system time count STC1 output from the first phase locked loop and a sign of the total number of delay counts calculated by the total delay calculator and summing up inversion results, and outputs the system time count STC1* to;

a second phase locked loop which receives the system clock count STC1* from the first adder, adjusts a system clock, and outputs a system time count STC2 based on the adjusted system clock;

a program clock reference generator which receives the system time count STC1* from the first adder, generates a program clock reference PCR2 based on a frequency of a predetermined clock signal, and transmits the program clock reference PCR2 to the multiplexer; and a second adder which obtains a presentation time stamp PCR2 by inversing a sign of a presentation time stamp PTS1 output from the demultiplexer and the total number of delay counts calculated by the total delay calculator and summing up inversion results, and transmits the presentation time stamp PTS2 to the transcoding condition determiner.

4. The transcoding system of claim 2, wherein the frequency of the predetermined clock signal is 10 Hz.

5. The transcoding system of claim 2, wherein the transcoding condition determiner receives the presentation time stamp PTS2 from the second adder, determines the transcoding conditions suitable for the end user environment, transmits a presentation time stamp PTS2*, which is obtained as a result of adjusting the presentation time stamp PTS2 according to the transcoding conditions, to the encoder via a register, and transmits a target frame rate, which is adjusted according to the transcoding conditions, to the encoder.

6. The transcoding system of claim 5, wherein if the transcoding condition determiner decides to change a frame rate, the presentation time stamp PTS2* is determined by the following equation:

$$PTS2^*(i)=PTS\_start + \Delta PTS \times (f1/f2) \times i$$

wherein f1 represents an original video frame rate, f2 represents a reset video frame rate, $PTS_{13}start$ represents a PTS2 value obtained if resetting of the original video frame rate initiates, $\Delta PTS$ represents the number of clocks counted between video frames, and i represents a serial number allotted to each of the video frames according to an order of presenting the video frames.

7. The transcoding system of claim 6, wherein if the transcoding condition determiner decides to increase a frame rate, the encoder creates new frames through a frame interpolation process.

8. The transcoding system of claim 1, wherein the timing synchronizer comprises:

a total delay calculator which calculates a total delay time and a total number of delay counts occurring in the transcoding system;

a phase locked loop which receives a program clock reference PCR1 from the demultiplexer, adjusts a system clock, and outputs a system time count STC1 based on the adjusted system clock;

an adder which obtains a system time count STC2 by inversing a signal of the system time count STC1 output from the phase locked loop and a sign of the total number of delay counts calculated by the total delay calculator and summing up inversion results, and outputs the system time count STC2 to;

a program clock reference generator which receives the system time count STC2 from the adder, generates a program clock reference PCR2 based on a frequency of a predetermined clock signal, and transmits the program clock reference PCR2 to the multiplexer; and a register which sets the system time count STC2 as a final presentation time stamp PTS2* if the register receives a load signal indicating that preparation of predetermined frames from the encoder, and provides the final presentation time stamp PTS2* to the encoder.

9. The transcoding system of claim 1, wherein the timing synchronizer comprises:

a total delay calculator which calculates a total delay time and a total number of delay counts occurring in the transcoding system;

a first phase locked loop which receives a program clock reference PCR1 from the demultiplexer, adjusts a system clock, and outputs a system time count STC1 based on the adjusted system clock;

an adder which obtains a system time count STC1* by inversing a signal of the system time count STC1 output from the first phase locked loop and a sign of the total number of delay counts calculated by the total delay calculator and summing up inversion results, and outputs the system time count STC1*;

a second phase locked loop which receives the system clock count STC1* from the first adder, adjusts a system clock, and outputs a system time count STC2 based on the adjusted system clock;

a program clock reference generator, which receives the system time count STC1* from the first adder, generates a program clock reference PCR2 based on the frequency of a predetermined clock signal, and transmits the program clock reference PCR2 to the multiplexer; and a register, which sets the system time count STC2 as a final presentation time stamp PTS2* if the register receives a load signal indicating that preparation of predetermined frames from the encoder, and provides the final presentation time stamp PTS2* to the encoder.

10. The transcoding system of claim 8, wherein the transcoding condition determiner determines the transcoding conditions suitable for the end user environment and transmits a target frame rate, which is adjusted according to the transcoding conditions, to the encoder.

11. The transcoding system of claim 10, wherein if the transcoding condition determiner decides to increase a frame rate, the encoder creates new frames through a frame interpolation process.

12. The transcoding system of claim 1, wherein the timing synchronizer comprises:
   a total delay calculator which calculates a total delay time and a total number of delay counts occurring in the transcoding system;
   a program clock reference buffer which receives a program clock reference PCR1 from the demultiplexer, stores the program clock reference PCR1 for the total delay time calculated by the total delay calculator, and then transmits the program clock reference PCR1;
   a program clock reference generator which receives the program clock reference PCR1 from the program clock reference buffer, generates a program clock reference PCR2 based on the frequency of a predetermined clock signal, and transmits the program clock reference PCR2 to the multiplexer; and
   a presentation time stamp buffer which receives a presentation time stamp PTS1 from the demultiplexer, and stores the presentation time stamp PTS1 for the total delay time calculated by the total delay calculator, and then transmits the presentation time stamp PTS1 to the transcoding condition determiner.

13. The transcoding system of claim 12, wherein if the transcoding condition determiner decides to change a frame rate, the presentation time stamp PTS2* is determined by the following equation:

$$PTS2^*(i) = PTS\_start + \Delta PTS \times (f1/f2) \times i$$

wherein f1 represents an original video frame rate, f2 represents a reset video frame rate, PTS_start represents a PTS2 value obtained if resetting of the original video frame rate initiates, ΔPTS represents the number of clocks counted between video frames, and i represents a serial number allotted to each of the video frames according to an order of presenting the video frames.

14. The transcoding system of claim 2, wherein the total number of delay counts is calculated by the following equation:

$$\text{Total number of delay counts} = M/f \times N$$

wherein M represents a system clock frequency used for forming a presentation time stamp, f represents an original video frame rate, and N represents the number of video frames transcoded during the total delay time calculated by the total delay calculator.

15. A transcoding method processed by at least one hardware processor that maintains timing parameters before and after performing a transcoding process, the transcoding method comprising:
   extracting timing parameters and video data that is compressed in a predetermined manner from an input transport stream;
   adjusting the timing parameters so that the video data can be synchronized with segmentation metadata even after the transcoding process;
   receiving the video data extracted from the input transport stream and restoring a video sequence by decompressing the video data;
   determining transcoding conditions suitable for an end user environment;
   re-compressing the video sequence which has been restored according to the transcoding conditions and recording a presentation time stamp, which is one of the adjusted timing parameters, in the compressed video sequence; and
   generating an output transport stream by multiplexing the video sequence and the segmentation metadata, and recording a program clock reference, which is one of the adjusted timing parameters, in a header of the output transport streams,
   wherein the adjusting the timing parameters comprising, adding a system time count and an inverse signal of the delay counts occurring in the transcoding system to obtain another system time count, and generating a program clock reference based on the obtained system time count to transmit the program clock reference to a multiplexer.

* * * * *